United States Patent
Kobayashi

(10) Patent No.: US 8,793,410 B2
(45) Date of Patent: Jul. 29, 2014

(54) DATA RATE THROTTLING IN AN INTERNAL PACKET-BASED INTERFACE

(75) Inventor: Osamu Kobayashi, Los Altos, CA (US)

(73) Assignee: STMicroelectronics, Inc., Coppell, TX (US)

( * ) Notice: Subject to any disclaimer, the term of this patent is extended or adjusted under 35 U.S.C. 154(b) by 431 days.

(21) Appl. No.: 12/888,255

(22) Filed: Sep. 22, 2010

(65) Prior Publication Data

US 2011/0145877 A1 Jun. 16, 2011

Related U.S. Application Data

(60) Provisional application No. 61/286,327, filed on Dec. 14, 2009, provisional application No. 61/322,752, filed on Apr. 9, 2010.

(51) Int. Cl.
| | | |
|---|---|---|
| *G06F 3/00* | (2006.01) | |
| *G06F 5/00* | (2006.01) | |
| *H04N 7/173* | (2011.01) | |
| *G09G 5/00* | (2006.01) | |
| *H04L 29/06* | (2006.01) | |

(52) U.S. Cl.
CPC .......... *G09G 5/006* (2013.01); *H04L 29/06176* (2013.01); *G09G 2370/14* (2013.01)
USPC .............. 710/52; 710/58; 725/115

(58) Field of Classification Search
CPC ......... H04L 27/00; H04L 7/00; H04L 7/0008; H04L 29/06176; H04N 19/00
USPC ...................... 710/52, 58; 725/115
See application file for complete search history.

(56) References Cited

U.S. PATENT DOCUMENTS

| | | | | |
|---|---|---|---|---|
| 5,179,348 A | * | 1/1993 | Thompson | 327/105 |
| 5,297,180 A | * | 3/1994 | Upp et al. | 375/363 |
| 5,781,135 A | * | 7/1998 | Kim et al. | 341/67 |
| 6,185,200 B1 | * | 2/2001 | Prasad | 370/342 |
| 6,606,678 B1 | * | 8/2003 | Nakamura | 710/305 |
| 2002/0080280 A1 | * | 6/2002 | Champion et al. | 348/584 |
| 2005/0066085 A1 | * | 3/2005 | Kobayashi | 710/62 |
| 2007/0009060 A1 | * | 1/2007 | Lavelle et al. | 375/295 |
| 2007/0174650 A1 | * | 7/2007 | Won et al. | 713/600 |

OTHER PUBLICATIONS

Hardware Secrets—Inside HDMI, Feb. 13, 2006, http://www.hardwaresecrets.com/article/Inside-HDMI-High-Definition-Multimedia-Interface/283/2.*

* cited by examiner

*Primary Examiner* — Farley Abad
(74) *Attorney, Agent, or Firm* — Beyer Law Group LLP

(57) ABSTRACT

Methods and systems for transmitting video pixel data from a transmitter component, such as a controller, to a receiver within a monitor are described. Video data is received at a transmitter at an incoming pixel rate based on a pixel clock. The data is transmitted to the receiver at a link symbol clock rate and is drained from the receiver at the pixel clock rate, which is regenerated by the receiver using the link symbol clock frequency, an M video value, and an N video value. The M video value (Mvid) is determined by the transmitter based on the incoming pixel rate and the N video value (Nvid) may be constant. An accumulator is used within the transmitter to ensure that the transmitter and receiver create a balanced system.

21 Claims, 4 Drawing Sheets

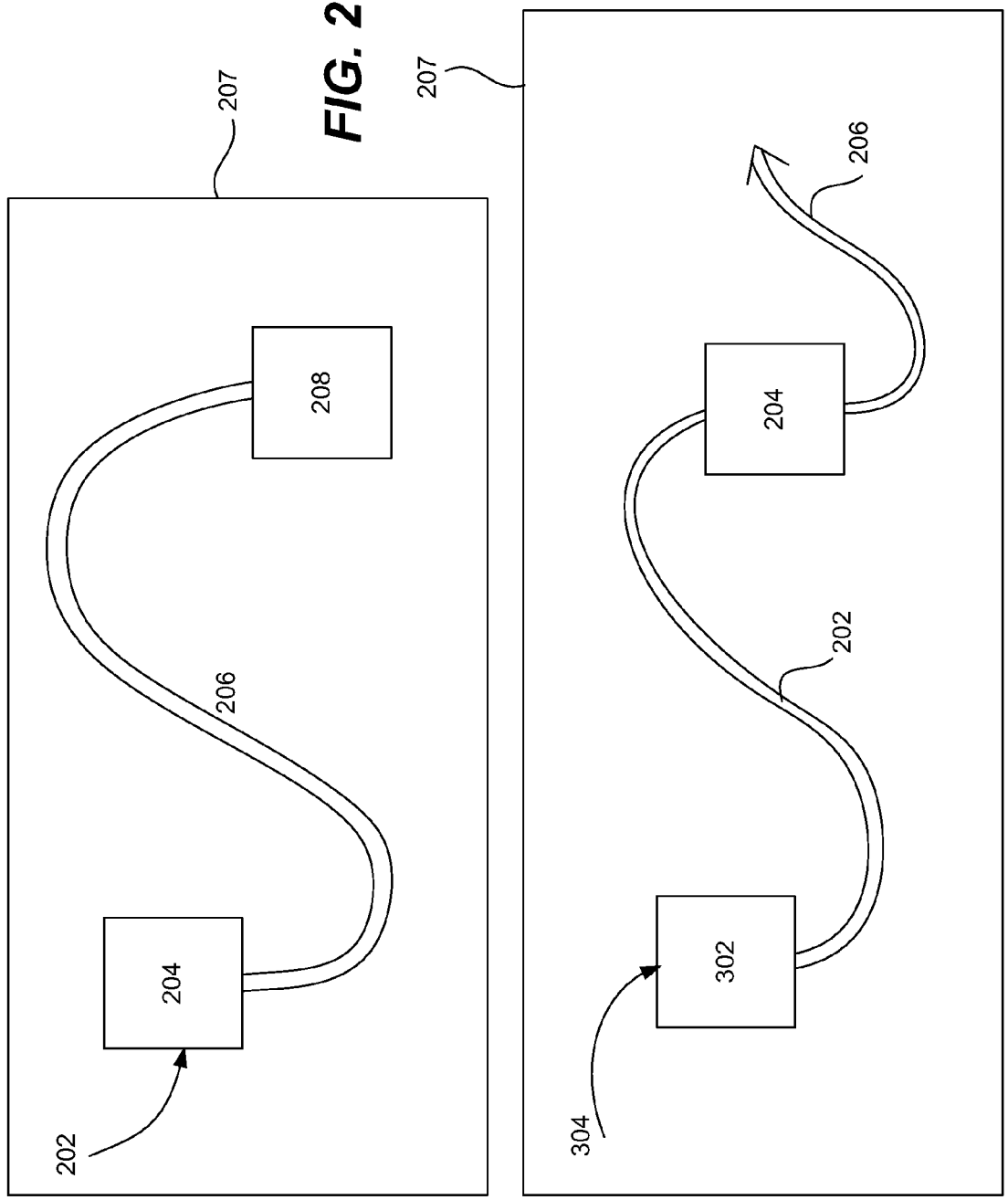

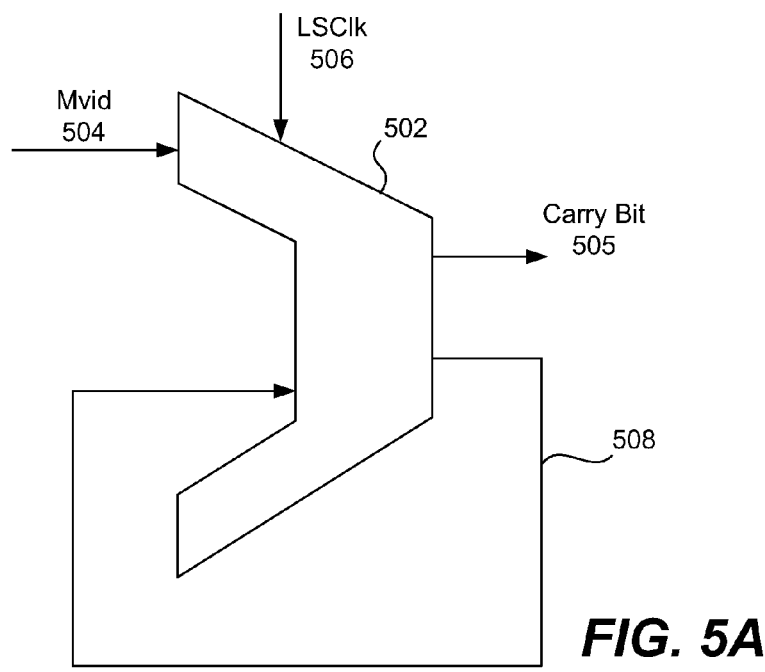
FIG. 5A
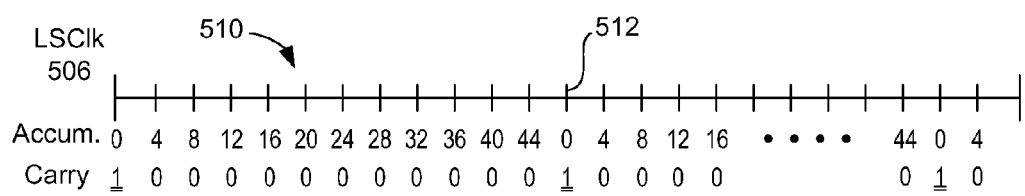
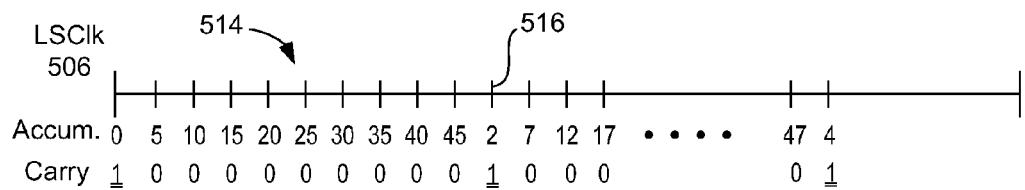
FIG. 5B

DATA RATE THROTTLING IN AN INTERNAL PACKET-BASED INTERFACE

CROSS-REFERENCE TO RELATED APPLICATIONS

This application claims priority under 35 U.S.C. §119(e) to Provisional Patent Application No. 61/286,327, titled "Digital Video Interface", filed Dec. 14, 2009, and Provisional Patent Application No. 61/322,752, titled "Digital Video Interface," filed Apr. 9, 2010, which are each hereby incorporated in their entirety and for all purposes.

TECHNICAL FIELD

The present invention relates generally to communication of various types of data within a digital component. More specifically, it relates to transmitting video pixel data from a controller to a timing controller in a TV or monitor.

BACKGROUND OF THE INVENTION

Display devices, such as monitors and TVs, are becoming increasingly prevalent in today's society. Manufacturers of displays are always searching for more efficient ways to transport video pixel streams within their display devices. Communicating data between modules and components within a display device should be done within minimum complication. In addition, the modules and components themselves, such as controllers, SOCs (system on chips), and timing controllers, should be kept simple and the amount of processing they are required to do should be kept to a minimum. These interconnections should be robust with respect to interoperability and should be cost-effective. If possible, they should leverage existing display interface technologies.

Existing Timing Controller (TCON) technology, now nearly 15 years old, used to transport a video pixel stream between a TV/monitor controller (SOC) and a TV/monitor panel TCON is becoming outdated and is not able to meet the more demanding requirements of display manufacturers. The technology uses many wires in parallel and is slow. It also uses Low Voltage Differential Signalling (LVDS) where the link rate is not fixed and where there may be different rates that are proportional to the pixel rate.

SUMMARY OF THE INVENTION

One aspect of the present invention is a method of transmitting video pixel data from a transmitter component, such as a controller, to a receiver, such as a timing controller, within a monitor. Video data is received at a transmitter at an incoming pixel rate based on a pixel clock. The data is transmitted to the receiver at a link symbol clock rate and is drained from the receiver at the pixel clock rate, which is regenerated by the receiver using the link symbol clock frequency, an M video value, and an N video value. The M video value (Mvid) is determined by the transmitter based on the incoming pixel rate and the N video value (Nvid) is constant. In this manner, a transmitter and receiver within the monitor forms a balanced system. Furthermore, only two clock domains are needed, the pixel clock and the link symbol clock, and the receiver does not have to maintain another clock domain. Instead, it regenerates the pixel clock rate using known quantities.

In one embodiment, certain operations occur at the transmitter before the video data is transmitted to the receiver. The transmitter may have two buffers, a front buffer and a transmitter buffer. Data is received at the front buffer at a first incoming data rate. The transmitter determines an M video value based on this incoming data rate. An accumulator having a carry bit is executed and increases in value at intervals of the M video value. Data is read from the front buffer to the transmitter when the carry bit changes value, such as from zero to one. The data is read at a second data rate. In one embodiment, the accumulator has a maximum value of 48 and the carry bit changes value when this value is reached and the accumulator wraps around or resets. When this reset occurs, data is read from the front buffer to the transmitter buffer.

In another aspect of the invention, the receiver component regenerates the pixel clock from other known quantities. One is the M video value, which it receives from the transmitter. The receiver component determines the frequency of the link symbol clock used for transmitting video pixel data from the transmitter. The receiver also receives an N video value or may already have this value, which may be constant, stored in memory. The pixel clock rate is regenerated using the Mvid, Nvid, and the link symbol clock frequency. In one embodiment, the Mvid is divided by the Nvid. The quotient may then be multiplied by the link symbol clock frequency to regenerate the pixel clock rate, which the receiver uses to drain the video data from the receiver buffer. Because the pixel clock rate is the incoming data rate to the transmitter and the data rate at which pixel data is drained from the receiver, a balanced system is maintained.

General aspects of the invention include, but are not limited to methods, systems, apparatus, systems on a chip (SOC), and computer-readable media for enabling video data transmission in a monitor.

BRIEF DESCRIPTION OF THE DRAWINGS

The invention and the advantages thereof may best be understood by reference to the following description taken in conjunction with the accompanying drawings in which:

FIG. 2 is a block diagram of a transmitter buffer, a receiving buffer, and a communication link between the two components in accordance with one embodiment;

FIG. 3 is a diagram showing a Tx buffer and input video pixel data stream as input to the buffer;

FIGS. 5A and 5B are diagrams of an accumulator logic component and its operation in accordance with one embodiment.

In the drawings, like reference numerals are sometimes used to designate like structural elements. It should also be appreciated that the depictions in the figures are diagrammatic and not to scale.

DETAILED DESCRIPTION

Reference is made to particular embodiments of the invention. One example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

Aspects of the invention pertain to methods and apparatus for enabling transmission of data from a transmitter component to a receiving component within a display device. In one embodiment, the data may be video pixel data transported as a pixel stream from a display controller to a display Timing Controller (TCON) component. The display controller may be implemented as a system on a chip (SOC). The display device may be any type of monitor, such as on a laptop or desktop computer monitor, a digital TV, or a monitor on a hand-held device. In one embodiment, the transmitter and receiver components support an internal version of a packet-based digital display interface ("internal" in that the interface is implemented among components within or inside a display device). Thus, for example, the controller (SOC) and the TCON component within the display device chassis may each implement the internal packet-based digital display interface and may communicate video pixel data between them using this interface, as described in greater detail below. In one embodiment, methods of transmitting video pixel data between components at varying pixel rates without having to recover a pixel clock in the receiving component thus limiting the number of clock domains to two, are described. These methods also prevent overflow between buffers, thereby creating a balanced, stable system.

Figure 1:
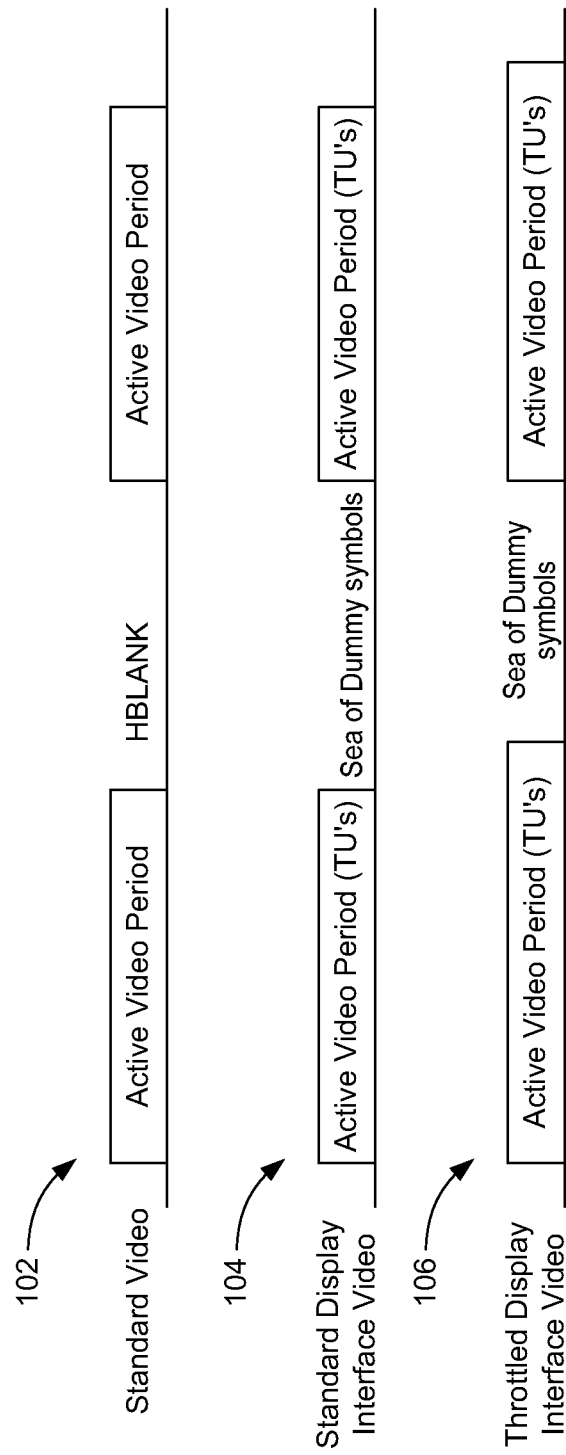
FIG. 1 is a simplified diagram showing components within a display device and communication of a video pixel stream between those components in accordance with one embodiment.

This varying or adjusting of pixel rates may be referred to as data rate throttling. An example of how this is used is provided below and may be helpful in introducing various embodiments of the present invention. FIG. 1 shows a series of timing diagrams that show the adjusted timing or data rate throttling feature of the present invention. In some instances, it may be more efficient or desirable to transmit video with timing that exceeds the available bandwidth between two components in a monitor or TV. In the internal, packet-based digital display interface, the transmitted video pixel data stream has an idle period (period of dummy symbols that is approximately equal to the video horizontal blanking period (HBLANK). It is permissible in the internal digital display interface to utilize some of this blanking or idle period to send video pixels, thereby reducing the required nominal pixel rate required over an internal digital display interface link, such as the link between a monitor controller (SOC) and a TCON. This adjusted timing or throttling is depicted in FIG. 1. One important effect of data rate throttling (DRT) function is to reduce the nominal pixel rate from the standard rate to a new, reduced or throttled rate. As explained in greater detail below, when DRT is active, an Mvid (M value for video) is selected such that the following equation is satisfied:

$$ThrottledDataRate = \left[ f\_LSClk * \left( \frac{Mvid}{48} \right) \right]$$

Referring now to FIG. 1, graph 102 shows the amount of active video sent using a non-digital packet-based display interface (standard video). Graph 104 shows the amount of active video (transfer units) sent using a standard or non-throttled digital packet-based display interface. (A transfer unit is used to carry main video stream data during its horizontal active period.) The period between the transmission of active video periods is used for dummy symbols. Graph 106 shows active video periods when data throttling is performed and digital packet-based display interface is used to transmit data. As can be seen, the active video period is longer than with the throttled digital interface implementation and the dummy symbol period is shorter.

As is known in the art, in Low Voltage Differential Signalling (LVDS), there is one data pair and one clock pair. The clock in LVDS is a pixel clock, where one key feature is that in one period of the pixel clock, one pixel of data is sent. In LVDS, used in the prior TCON technology, the link symbol clock varies and is not fixed. The amount the link symbol clock varies is proportional to the pixel rate. As described in greater detail below, in contrast the link symbol clock in the internal packet-based display interface of the present invention is fixed and does not vary. The rate is fixed, for example, at a nominal 3.24 GHz/sec or 324 MHz/sec, regardless of the type of video pixel data stream (e.g., standard definition, high definition (HD), full HD, FHD 120 Hz, and so on). As noted, an example may be useful in illustrating the various embodiments.

Consider the transmission of 1920×1080p (FHD) @ 120 Hz. The standard video horizontal line length (HorTotal) is 2200 pixel clock cycles and the total video vertical line count is 1125 pixel clock cycles. This yields a pixel rate of 297 Mpixels/sec and corresponds to an Mvid value equal to 44. Assume that 36-bit pixels are sent (i.e., 12-bit colors). This requires (36 bits/pixel divided by 8 bits/Symbol)*297 Mpixels/sec, which equals 1337 MSymbols/sec of overall link bandwidth. This cannot be supported with 4 lanes of an internal digital display interface link operating at a symbol rate of 324 MSymbols/sec/lane, since 324 MSymbols/sec/lane*4 lanes is equal to 1296 Msymbols/sec. This is smaller than 1337 MSymbols/sec. The DRT function of the present invention may be applied to address the issue raised in this scenario. Suppose the DRT function reduces the HorTotal by 100 pixel clock cycles and adjusts the pixel clock rate to 283.5 Mpixels/sec, which is now the throttled data rate. This corresponds to an Mvid value equal to 42. This DRT pixel rate now requires (36 bits/pixel divided by 8 bits/Symbol)*283.5 Mpixels/sec, which equals 1276 MSymbols/sec of overall bandwidth. This bandwidth can be supported with 4 lanes of the internal display interface link operating at 324 MSymbols/sec/lane. Thus, through DRT, the pixel rate was reduced to fit the bandwidth.

As noted, a link symbol clock frequency, f_LSClk, may be 324 MHz. Each link symbol carries 1 byte of data, resulting in link symbol rate of 324 Mbytes/sec. For pixel bit depth of 24 bits/pixel, or 3 bytes per pixel, this results in 108 MPix/sec if there are no dummy symbols over a single lane. If half the data bytes are dummy bytes, the rate becomes 54 MPix/sec, if three quarters, 27 MPix/sec. As can be seen, the pixel transfer rate depends on the number of dummy bytes. This is relatively coarse and various embodiments of the present invention improve on this. One way to achieve finer adjustment of the pixel transfer rate to other values, for example 100, 88, 51, or 32, is to use data rate throttling.

In the case of the internal digital display interface, there is no clock. In one embodiment, the regenerated frequency of the pixel clock, f_PixClk', at the receiving component, such as the TCON, may be defined as $$ThrottledDataRate = \left[ f\_LSClk * \left( \frac{Mvid}{48} \right) \right]$$

Here, ThrottledDataRate is f_PixClk' (pixel clock prime). Mvid may have a maximum value of 224 and 48 is the fixed Nvid (N value for video).

Video pixel clock recovery, described below, is the operation of recovering the video pixel clock from the link symbol clock and other data.

FIG. 2 is a block diagram of a transmitter (TX) buffer, a receiving (RX) buffer, and a communication link between the two components in accordance with one embodiment. As noted above, these components are physically within the chassis of a monitor or TV 207. A video pixel data stream 202 is transmitted to TX_Buffer 204. The transfer of this video pixel data is at a video pixel clock rate. Video pixel data stream 202 is transferred out ("drained") from Tx buffer 204 to RX_buffer 208 via communication link 206. As described in greater detail below, video data 202 is drained out of buffer 204 at a link symbol clock rate. This clock rate can be adjusted by varying a valid symbol to dummy symbol ratio. The link symbol clock rate may be close to the pixel clock rate in a balanced system. The valid to dummy symbol ratio may be controlled by Tx buffer 202.

Video pixel data stream 202 is drained from buffer 208 at very close to the video pixel clock rate which, further to the definition provided above, is the rate of transfer of video pixel data from RX_buffer 208. The video pixel clock used to drain the video data stream from buffer 208 (referred to as video pixel clock' (prime)) should be the same as the video pixel clock used to transfer data to Tx buffer 204 with a very small deviation. Video pixel clock' is regenerated at buffer 208, since buffer 208 does not have its own clock (nor does buffer 202). However, as noted above, it is desirable to keep RX_buffer 208 as simple as possible and, thus, to keep the implementation of the recovery process to pixel video clock' as simplified as possible. However, as is known to those skilled in the art, clock regeneration can be complicated. One of the goals here is to simplify the pixel video clock' regeneration process at buffer 208.

As noted above, the frequency of the pixel video clock', can be regenerated by Rx buffer 208 using the following: f_PixClk'=Mvid/Nvid*f_LSClk. This is the same formula provided above for ThrottledDataRate, with Nvid set to 48 decimals (6-bit value).

In LVDS, 24 bits of data are mapped to four data lines in one pixel clock period (in which one pixel is sent). In the internal packet-based digital display interface standard, the link symbol clock (LSClk) is fixed. However, the rate at which video pixel data is drained from Tx buffer 204 to Rx buffer 208 may be adjusted by varying the valid:dummy symbol ratio, which may be controlled by TX_buffer 204. An example of determining this ratio is described below. In other words, Tx buffer 204 can control the flow of video pixel data being drained by mixing the number of valid and dummy symbols being transferred from it. In one embodiment, the maximum burst cycle is 32 LSClk (32*t_LSClk). By making the burst cycle smaller, the size of Tx buffer 204 (e.g., a FIFO buffer) can be minimized.

In one embodiment, TX_buffer 204 sends the Mvid and Nvid values to RX_buffer 208. Nvid is set to 48 and this is the value that is always sent by Tx buffer 204. This number is very divisible and is also sufficiently high enough to enable precise video pixel clock regeneration by RX_buffer 208. In other embodiments, the Mvid value may vary. The frequency of the link symbol clock, which is fixed, is generated by RX_buffer 208 from link 206 using methods known in the art. These factors allow RX_buffer 208 to recover video pixel clock' in a relatively simplified manner.

For example, incoming pixel rate (202)=60 Mpixels/sec @ 24 bits/pixel (3 bytes/pixel)=180 Mbytes/sec and link rate (206)=324 Mpixels/sec @ 8 bits/symbol (8 meaningful bits)=324 Mbytes/sec. The ratio here is 180/324* 32 (LSClk)=17.9 ratio, which may be rounded to 18. Thus, there may be 18 valid symbols for each dummy symbol, an 18:1 ratio. By limiting the burst cycle or length to 32 LSClks, the buffer size of RX_buffer may be limited to having to store 32 symbols. It is the responsibility of TX_buffer 204 to evenly distribute the valid data symbols (dummy data does not have to be stored in RX_buffer 208). This concept is shown in graph 106 in FIG. 1.

One of the objectives is to achieve a balanced system between buffers 204 and 208. The regular (non-internal) digital display interface standard enables adjusting the video pixel stream even if the link symbol clock rate is fixed. In the internal display interface standard, where one of the goals is to keep RX_buffer 208 as simple as possible, while enabling it to recover video pixel clock rate', the Nvid is set to 48 because it is highly divisible. The other variable in the clock regeneration equation (i.e., f_pixelclk'=Mvid/Nvid*f_LSClk) is the frequency of the link symbol clock, f_LSClk, which, in one embodiment, is equal to the standard 324 MHz. (Note that the formula may also be written as f_pixelclk'=Mvid*f_LSClk/Nvid.) If the link symbol clock frequency is divided by Nvid, that is, 324 MHz/48, the result is 6.75 MHz. Therefore, following the formula, when Mvid changes by 1, f_pixelclk' changes by 6.75 MHz. This leads to the values for Mvid and f_LSClk shown in Table 1 below. This table may be stored in a file in a data storage component in the transmitter component. The file may be referred to as an Mvid-to-Pixel Data Rate file. The file may be stored in a memory local to the transmitter or general memory of the monitor.

TABLE 1

| MVid | Pixel Data Rate (Mpix/see) NVid = 48 f_LSClk = 324 |
|---|---|
| 1 | 6.75 |
| 2 | 13.50 |
| 3 | 20.25 |
| 4 | 27.00 |
| 5 | 33.75 |
| 6 | 40.50 |
| 7 | 47.25 |
| 8 | 54.00 |
| 9 | 60.75 |
| 10 | 67.50 |
| 11 | 74.25 |
| 12 | 81.00 |

Recall from above that one of the problems with the internal packet-based digital display interface standard was the coarseness of the video pixel data clock rate that could be regenerated. They would have to be 108 (324/3), 54 (108/2), 27 (108/4), etc. This was inadequate for regenerating a pixel data clock rate that is 100, or 79, or 32, etc. The values in Table 1 together with the methods described below can be used to recover pixel data clock' at the RX_buffer with a high degree of precision and without adding complexity to the TCON. The methods described below enable data rate throttling by the TX_buffer to maintain a balanced system. As described below, the regenerated video pixel data clock rate' has a granularity or maximum difference of 6.75 MHz from the incoming pixel data clock rate.

As mentioned, TX_buffer sends the Mvid value to the RX_buffer. It selects the Mvid value based on the incoming pixel data rate using the values in Table 1. If the incoming pixel data rate happens to be exactly 33.75, the Mvid value that it sends is 5, if the incoming rate is 67.5, the Mvid value sent is 10, and so on. (Table 1 only shows the first 12 Mvid values; the values for Mvid may go up to 64 for a pixel data rate of 432). However, as will most often be the case, the incoming pixel data rate may not exactly match one of the pixel data rates in Table 1. What if the incoming pixel clock is 25 MHz or 31 MHz? The pixel data rate is in Mpix/sec units which maps to pixel data clock rate measured in MHz For example, 27 Mpix/sec is 27 MHz.

These rates have no exact match in Table 1. The pixel clock rate can change over time and thus the Mvid value can also vary. It is the responsibility of the Tx to look up the Mvid value and transmit it and the Nvid value to the Rx buffer so that the Rx can regenerate the pixel data clock using these two variables and the f_LSClk. It is also the responsibility of the Tx buffer to ensure that the Rx buffer is filled with video pixel data at close to the same rate as video pixel data is being inputted to the Tx buffer. If the Rx buffer fills faster than it drains, there will be overflow and if it fills slower than it drains, there will be an underflow. Thus, in addition to providing the Rx buffer with the Mvid and Nvid values, the Tx buffer must also ensure that the rates at which each buffer is filled are as close as possible. If the incoming pixel clock value is not exactly one of the values in Table 1, there will be a difference in rates at which the Rx buffer and Tx buffer get filled.

FIG. 3 is a diagram showing Tx buffer 204 and input video pixel data stream 202 as input to buffer 204. Also shown is a front buffer 302 which transmits video pixel data stream 202 to buffer 204. Front buffer 302 receives a video pixel data stream 304 at an incoming pixel clock rate from an external source. Buffers 302 and 204 are within the transmitter component, controller or SOC. Video data stream 202 is coming from front buffer 302 at a "reading rate" that may be faster or slower than the incoming pixel clock rate. For example, if the incoming pixel clock rate 304 is 25 MHz, the closest rate in Table 1 is 27 MHz which has an Mvid value of 27 MHz. Front buffer 302 will drain to Tx buffer 204 at 27 MHz (the reading rate and the rate of video stream 202). This is faster than the incoming pixel data rate of 25 MHz so data is being read or drained faster from front buffer 302 than data is coming in. However, it is possible to put in extra data in the front buffer 302 to compensate for the faster drain rate. This is possible because there are blanks that have no meaningful data that can be put in front buffer 302. For example, there may be a horizontal active period of 1920 pixel clock cycles followed by a horizontal blanking period of 280 pixel clock cycles which can be used to store extra data in the front buffer (the number of pixels needed may be relatively small and much less than what can be stored in 280 cycles). This will prevent an underflow in the front buffer and the process will end without any issues. Thus, the rate of incoming pixel data 202 is the reading rate and corresponds to one of the Mvid values in Table 1.

Figure 4:
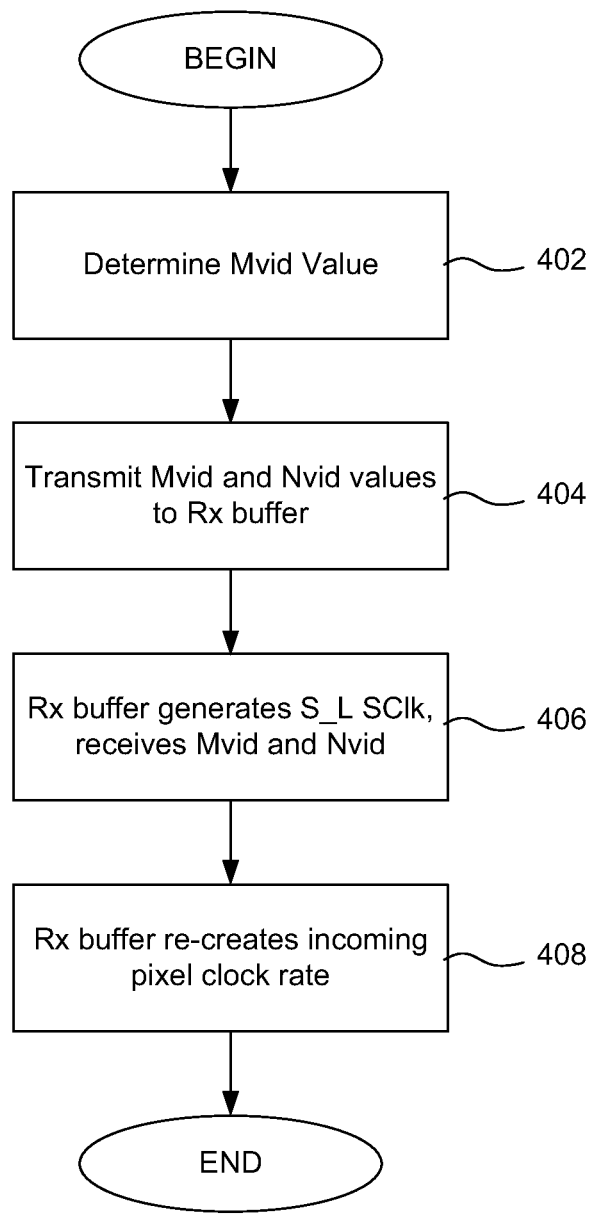
FIG. 4 is a flow diagram of a process of regenerating a pixel clock rate at an Rx buffer in accordance with one embodiment.

Before describing methods of ensuring that the buffers do not overflow or underflow by using an accumulator logic component between the front buffer and the Tx buffer, processes of regenerating the pixel clock rate, that is, deriving f_PixClk', at the Rx buffer is summarized in FIG. 4. FIG. 4 is a flow diagram of a process of regenerating a pixel clock rate at an Rx buffer in accordance with one embodiment. At step 402 Tx buffer determines what the Mvid value is using the data in Table 1. It may already know this value from operations that occur between the Tx buffer and the front buffer. If not, it can determine the incoming pixel clock rate and use that value to find the Mvid value from Table 1. At step 404 the Tx buffer transmits the Mvid value and the Nvid value of 48 to the Rx buffer over link 206 at f_LSClk. At step 406 the Rx buffer receives the Mvid and Nvid values and generates the f_LSClk from link 206. At step 408 the Rx buffer uses these values to recreate the incoming pixel clock rate, which is the throttled data rate, f_PixelClk'. This regeneration operation in the Rx buffer is relatively easy because Nvid is fixed at 48. In this manner, only two clock domains are needed in the Tx buffer, the pixel clock and the link symbol clock. The regeneration operation may be performed by logic in the receiver, such as a pixel clock regeneration module or logic component.

Returning now to the transmission of video pixel data between the front buffer and the Tx buffer, recall that the incoming pixel clock to the front buffer may be a value that does not correspond exactly to one of the values in Table 1. From the example above, the incoming pixel clock rate may be 25 MHz. The transmitter can measure this rate and determine that 27 MHz is the closest rate and determine that the Mvid is 4. This value may now be used in an operation with an accumulator in the transmitter to determine when the Tx buffer will read data from the front buffer.

FIG. 5A is a diagram of an accumulator logic component in accordance with one embodiment. FIG. 5B are graphs illustrating operation of the accumulator. Each unit in the graphs is one link symbol clock (LSClk) cycle (shown by the evenly spaced vertical lines). Recall that the link symbol clock is one of the clock domains maintained by the transmitter. Also shown is an accumulator value which changes by intervals equal to the Mvid value with each passing clock cycle and wraps around at 48, the Nvid value. The third data value is the value of the accumulator's carry bit. Referring to FIG. 5A, in one embodiment, an accumulator logic component 502 has a maximum value of 48. When accumulator 502 reaches a value of 48, its carry bit 505 changes from 0 to 1 and the accumulator "wraps" around or resets and begins accumulating from zero again. The inputs to accumulator 502 are Mvid value 504 and the link symbol clock LSClk) cycle 506. The output is a carry bit 505. When accumulator 502 reaches a value of 48, it wraps around as indicated by arrow 508. When the accumulator value is 0, its carry bit is 1, because a wrap around or carry has just occurred. Once the accumulator value is not 0, its carry bit changes to 0.

Examples of how accumulator 502 is used to determine when the Tx buffer reads a symbol from the front buffer are shown in the graphs shown in FIG. 5B. Each of the units in graph 510 shows one cycle of LSClk 506. In graph 510 the Mvid value 504 is 4. The accumulator increases by 4 with each clock cycle. The carry bit 505 is initially set to 1 (because accumulator value is 0). After the first clock cycle, after there is a non-zero value in the accumulator, the carry bit becomes 0. When the accumulator value is equal to or becomes greater than 48, the carry bit is set to 1, indicating that there is a carry and accumulator value becomes 0. It is at this link symbol clock edge (the $12^{th}$ cycle) shown as edge 512, where the carry bit becomes 1, that one symbol (entry) from the front buffer is read by the Tx buffer. It is only at this time that the front buffer is read. The accumulator is said to wrap around at this clock cycle and its value becomes 0 (instead of 48) and the process begins again.

Another example is shown in graph 514. The incoming pixel clock may be 32 MHz, thus the Mvid value is set to 5 since 32 is closest to 33.75 MHz. This is the rate at which data is being read from the front buffer. The carry bit starts at 1 (accumulator value is 0). The accumulator increases by 5 with each cycle of LSClk 506. After the first clock cycle, when there is a value in the accumulator, the carry bit becomes 0. The accumulator increases by 5 with each cycle until it gets to 45. On the next clock cycle, the accumulator will wrap around to 2 (50–48) instead of going to 50 (45+5). Once the carry or wrap around occurs, the carry bit is set to 1. At this time, the Tx buffer reads one symbol from the front buffer. As the clock cycles continue from there, the carry bit is set to 0 again. On the clock cycle after the accumulator reaches 47, the accumulator wraps around to 4 and the carry bit is set to 1 as shown in graph 514 and the front buffer is read again.

Initially, the Tx may wait until the front buffer is filled a small amount to prevent underflow. Once it is filled a small amount, the accumulator starts and when the carry bit is reset to 1 from 0, then a symbol or entry is read from the front buffer. In this embodiment, the carry bit is essentially functioning as a read signal for reading from the front buffer. This is done in the Tx to generate a read control clock.

As noted above, the Tx only needs to maintain two clock domains: pixel clock and a link symbol clock. There is no need to create another clock domain, which is a resource and costly solution. It is preferable to use the same clock (pixel clock) and throttle the data rate on the Rx side. Regenerating the pixel clock is facilitated because Nvid is 48.

In some embodiments, the Tx may choose the slower Mvid value, which may not necessarily be the closest one. By doing so, the reading rate is slowed down, which may be desirable or at least a factor worth considering when the pixel clock is extremely fast.

In one embodiment, care must be taken to ensure that the TCON (receiver) is capable of recovering video data that has been throttled. For example, the transmitted Mvid value must meet some requirements. For example, in both throttled and un-throttled cases, the pixel data rate and corresponding Mvid value should be selected such that the required bandwidth is within the available link bandwidth. This requirement is met if the following (equivalent) equations are satisfied:

a. $\left[f\_LSClk*\left(\frac{Mvid}{48}\right)\right]*\left(\frac{PixelBitDepth}{8}\right) \leq (LaneCount*f\_LSClk)$ b. $Mvid \leq \left[\frac{LaneCount*48}{\left(\frac{PixelBitDepth}{8}\right)}\right]$ The video pixel clock, in one embodiment, referred to as PanelTconPixClk, regenerated by the RX should be within the panel TCON pixel clock range specification. This requirement is met if the following (equivalent) equations are satisfied:

c. $f\_PanelTconPixClk\_MIN \leq$
$\left[f\_LSClk*\left(\frac{Mvid}{48}\right)\right] \leq f\_PanelTconPixClk\_MAX$ d. $f\_PanelTconPixClk\_MIN*\left(\frac{48}{f\_LSClk}\right) \leq$
$Mvid \leq f\_PanelTconPixClk\_MAX*\left(\frac{48}{f\_LSClk}\right)$ The total number of horizontal blank pixels in the Rx is reduced when DRT is active, thus reducing the total horizontal pixels (TCONHorTotal). The reduction should be within the TCON's tolerable range as the following (equivalent) equations specify e. $PanelTconHorTotal\_MIN \leq$
$\left[InputHorTotal*\left(\frac{Mvid}{48}\right)\right] \leq PanelTconPixClk\_MAX$ f. $\left(\frac{48*PanelTconHorTotal\_MIN}{InputHorTotal}\right) \leq$
$Mvid \leq \left(\frac{48*PanelTconPixClk\_MAX}{InputHorTotal}\right)$ In one embodiment, the Tx limits the ThrottledDataRate to frequencies equal to or smaller than the input pixel rate, thereby reducing the regenerated pixel clock frequency, f_PixClk' in the Rx.

If the methods described above are employed, the Tx must have enough front buffer capacity to tolerate the difference between the incoming video pixel rate and the throttled rate the Tx chooses. The larger the difference between the incoming video pixel rate and the throttled rate, the larger the Tx FIFO size must be.

With DRT operation enabled, the recovered pixel clock at the Rx, PanelTconPixClk, equals ThrottledDataRate. Also, since the number of active pixels is the same at the Rx and Tx, it follows that the number of recovered horizontal blanking pixels will be less than the number of horizontal blanking pixels in the source video timing prior to retiming/throttling. Furthermore, it is possible that in some iDP Source device implementations, the number of recovered horizontal blanking pixels will vary by ±1 or ±2 pixels line to line. A Panel TCON must be capable of tolerating this variance. Finally, it should be noted that throttling does not affect the buffer size requirement in the Rx as it regenerates the video pixel clock stream at the throttled rate which is equal to Mvid/48*f_LSClk.

In addition, embodiments of the present invention further relate to integrated circuits and chips (including system on a chip (SOC)) and/or chip sets or packages. By way of example, each of the devices described herein may include an integrated circuit chip or SOC for use in implementing the described embodiments and similar embodiments. Embodiments may also relate to computer storage products with a computer-readable medium that has computer code thereon for performing various computer-implemented operations. The media and computer code may be those specially designed and constructed for the purposes of the present invention, or they may be of the kind well known and available to those having skill in the computer software arts. Examples of tangible computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor. In addition to chips, chip systems, and chip sets, the invention can be embodied as firmware written to said chips and suitable for performing the processes just described.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of transmitting data from a first buffer to a second buffer, the method comprising:
   receiving data at the first buffer at a first data rate;
   determining an M video value based on the incoming data rate;
   executing an accumulator having a carry bit, wherein an accumulator value increases in intervals of the M video value; and
   reading data from the first buffer to the second buffer when the carry bit changes value, such that the data is read at a second data rate.

2. A method as recited in claim 1 further comprising:
   storing an initial amount of data in the first buffer before said reading of data.

3. A method as recited in claim 1 wherein a maximum value of the accumulator is an N video value wherein the accumulator resets when the maximum value is reached.

4. A method as recited in claim 1 further comprising:
   increasing the accumulator value by the M video value with each link symbol clock cycle.

5. A method as recited in claim 1 further wherein determining an M video value further comprises:
   examining a data file storing M video values and associated data rates.

6. A method as recited in claim 5 wherein the second data rate corresponds to one of the associated data rates in the data file.

7. A method as recited in claim 1 wherein the data is a video pixel data stream.

8. A method as recited in claim 1 wherein the first and second buffer are in a transmitter component.

9. A method of regenerating a pixel clock at a receiver component, the method comprising:
   receiving an M video value from a transmitter, the M video value based on an incoming data rate;
   receiving an N video value from the transmitter, the N video value based on an incoming data rate;
   determining a frequency of a link symbol clock used for transmitting data between the receiving component and a transmitter;
   dividing the M video value by the N video value, thereby deriving a quotient and
   regenerating a pixel clock rate using the quotient, and the link symbol clock frequency, wherein the receiver operates using the link symbol clock and pixel clock.

10. A method as recited in claim 9 wherein the M video value is determined based on an incoming pixel clock.

11. A method as recited in claim 9 wherein the quotient is multiplied by the link symbol clock frequency.

12. A method as recited in claim 9 wherein the N video value is a constant.

13. A method a recited in claim 9 wherein the link symbol clock is fixed and the M video maximum value is 224.

14. A method as recited in claim 9 wherein changing the M video value by one changes the regenerated pixel clock rate by 6.75 MHz.

15. A transmitter comprising:
    a front buffer configured to store incoming pixel data at an incoming pixel data rate;
    a transmitter buffer configured to store the pixel data read from the front buffer; and
    an accumulator logic component having a carry bit and configured to determine when to read pixel data from the front buffer to the transmitter buffer,
    wherein the transmitter determines an M video value based on the incoming pixel data rate, and
    wherein the accumulator logic component is configured to increase in value by intervals equal to a constant predetermined value, the constant predetermined value based on the M video value and the accumulator logic reads pixel data from the front buffer to the transmitter buffer when the carry bit changes value.

16. A transmitter as recited in claim 15 further comprising:
    a memory storing an incoming data rate-to-M video value data file.

17. A transmitter as recited in claim 16 wherein the accumulator logic component increases value with each link symbol clock cycle.

18. A monitor comprising:
    a transmitter component having a front buffer, a transmitter buffer and an accumulator logic module, the accumulator logic module having a carry bit and increasing in value by intervals equal to an M video value based on an incoming pixel data rate;
    a receiver component having a pixel clock regeneration module and a receiver buffer;
    a link symbol clock; and
    a pixel clock regeneration module, wherein data is transferred from the transmitter buffer to the receiver buffer at a link symbol clock rate, wherein the link symbol clock rate is based on the M video value.

19. A monitor as recited in claim 18 further comprising:
    a data storage component storing an M video value data file.

20. A monitor as recited in claim 18 wherein the pixel clock regeneration module generates a pixel clock rate using an N video value, an M video value, and link symbol clock.

21. A monitor as recited in claim 18 further comprising a link symbol clock and a pixel clock.

* * * * *